US008942660B2

(12) United States Patent
Edge et al.

(10) Patent No.: US 8,942,660 B2
(45) Date of Patent: Jan. 27, 2015

(54) METHOD AND APPARATUS FOR PERFORMING HANDOVER OF AN EMERGENCY CALL BETWEEN WIRELESS NETWORKS

(75) Inventors: Stephen W. Edge, Escondido, CA (US); Arungundram C. Mahendran, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 346 days.

(21) Appl. No.: 12/793,580

(22) Filed: Jun. 3, 2010

(65) Prior Publication Data

US 2010/0311386 A1 Dec. 9, 2010

Related U.S. Application Data

(60) Provisional application No. 61/184,695, filed on Jun. 5, 2009, provisional application No. 61/231,965, filed on Aug. 6, 2009.

(51) Int. Cl.
*H04M 11/04* (2006.01)
*H04W 36/00* (2009.01)
(Continued)

(52) U.S. Cl.
CPC ........ *H04W 36/0022* (2013.01); *H04W 76/007* (2013.01); *H04W 4/22* (2013.01)
USPC ..................... 455/404.1; 455/404.2; 455/436; 455/439

(58) Field of Classification Search
CPC ....... H04W 4/22; H04W 76/007; H04W 4/02; H04M 2242/04; H04M 3/5116
USPC ........... 455/404.1, 404.2, 436, 442, 437, 438, 455/439, 440, 443, 444, 445
See application file for complete search history.

(56) References Cited

U.S. PATENT DOCUMENTS 5,570,411 A * 10/1996 Sicher ........................... 455/450
6,424,638 B1    7/2002 Ray et al.
(Continued)

FOREIGN PATENT DOCUMENTS

CN    101132542 A    2/2008
KR    20090003135 A    1/2009
(Continued)

OTHER PUBLICATIONS

3rd Generation Partnership Project, 22-36 Technical Specification Group Services and System Aspects, SR VCC Support for IMS Emergency Calls (Release 9), 3GPP Standard, 3GPP TR 23.870, 3rd Generation Partnership Project (3GPP), Mobile Competence Centre, 650, Route Des Lucioles, F-06921 Sophia-Antipolis Cedex, France, No. V9.0.0, Jun. 1, 2009, pp. 1-14, XP050364047.
(Continued)

*Primary Examiner* — Kathy Wang-Hurst

(57) ABSTRACT

Techniques for supporting handover of an emergency call between wireless networks are described. A UE may communicate with a first wireless network (e.g., a 3GPP E-UTRAN) for an emergency call and may receive an indication to perform handover to a second wireless network (e.g., a CDMA2000 1xRTT network). In an aspect, the UE may send a message including an emergency indication (an emergency global number, or a reserved emergency number, or some other indication) to initiate handover to the second wireless network. A designated network entity may recognize the emergency call based on the emergency indication and may map the emergency indication to a local emergency number or an Emergency Session Transfer Number for SRVCC (E-STN-SR), which may be used to establish a new incoming call leg to a network server anchoring the emergency call. The UE may then communicate with the second wireless network via the network server for the emergency call after handover.

32 Claims, 9 Drawing Sheets

(51) Int. Cl.
*H04W 76/00* (2009.01)
*H04W 4/22* (2009.01)

(56) References Cited

U.S. PATENT DOCUMENTS

| | | | |
|---|---|---|---|
| 7,054,283 | B2 | 5/2006 | Carlsson et al. |
| 2001/0014604 | A1 | 8/2001 | Kingdon et al. |
| 2006/0014517 | A1 | 1/2006 | Barclay et al. |
| 2006/0258352 | A1 | 11/2006 | Ishii |
| 2007/0004378 | A1 | 1/2007 | Muhonen |
| 2007/0004429 | A1 | 1/2007 | Edge et al. |
| 2007/0135089 | A1 | 6/2007 | Edge et al. |
| 2007/0171861 | A1 | 7/2007 | Akhtar |
| 2007/0207806 | A1* | 9/2007 | Shaheen ............ 455/436 |
| 2007/0254625 | A1 | 11/2007 | Edge |
| 2007/0287448 | A1* | 12/2007 | Kim et al. ............ 455/433 |
| 2010/0041418 | A1 | 2/2010 | Edge et al. |
| 2010/0202407 | A1 | 8/2010 | Edge |
| 2011/0165856 | A1* | 7/2011 | You et al. ............ 455/404.1 |

FOREIGN PATENT DOCUMENTS

| | | |
|---|---|---|
| WO | WO2007002303 | 1/2007 |
| WO | WO2007016695 | 2/2007 |
| WO | WO-2007035736 | 3/2007 |
| WO | WO2008028402 A1 | 3/2008 |

OTHER PUBLICATIONS

International Search Report and Written Opinion—PCT/US2010/037494, International Search Authority—European Patent Office—Mar. 18, 2011.
Nokia Siemens Networks et al., "Location Continuity in SRVCC", 3GPP Draft, S2-091157 S2 71_SRVCC.LCS.V02, 3rd Generation Partnership Project (3GPP), Mobile Competence Centre, 650, Route Des Lucioles, F-06921 Sophia-Antipolis Cedex, France, no. Budapest, Feb. 10, 2009, XP050333559.
Nokia Siemens Networks et al: "SRVCC functionality for emergency calls" 3GPP Draft; S2-093438—Merged of Agreed 23 216 CRs in S2-092792 and S2-092793, 3rd Generation Partnership Project (3GPP), Mobile Competence Centre ; 650, Route Des Lucioles ; F-06921 Sophia-Antipolis Cedex France, no. Tallinn ; May 5, 2009, XP050346518.
Partial International Search Report—PCT/US2010/037494—International Search Authority, European Patent Office, Oct. 13, 2010.
Qualcomm Europe: "SRVCC functionality for emergency calls" 3GPP Draft; S2-093755 (Rev of S2-093574-S2-092792), 3rd Generation Partnership Project (3GPP), Mobile Competence Centre ; 650, Route Des Lucioles ; F-06921 Sophia-Antipolis Cedex France, no. Tallinn ; May 14, 2009, i May 4, 2009, XP050346787.
"3rd Generation Partnership Project; Technical Specification Group Services and System Aspects; Evaluation of LCS Control Plane Solutions for EPS (Release 9), "3GPP Standard; 3GPP TR 23.891, 3rd Generation Partnership Project (3GPP), Mobile Competence Centre; 650 Route Des Lucioles; F-06921 Sophia-Antipolis Cedex; France, No. V.0.3.0, Jan. 1, 2009, pp. 1-62, XP050380737, paragraphs [6.1.2.1], [6.1.3.1], paragraph [6.1.3.5], paragraph [6.1.3.5.3]—paragraph [6.1.3.6], paragraph [6.2.3.5]—paragraph [6.2.3.6], paragraphs [6.2.5] , [6.5.3.2], [6.5.5.2].
Alcatel-Lucent, et al., "TR 23.891 Inter-MME Location Continuity" 3GPP Draft; S2-090682 R2 (WAS 0071) E-UTRAN Location Continuity, 3rd Generation Partnership Project (3GPP), Mobile Competence Centre ; 650, Route Des Lucioles ; F-06921 Sophia-Antipolis Cedex ; France, no. Phoenix; Jan. 16, 2009, XP050333147 [retrieved on Jan. 16, 2009] the whole document.
Huawei: "Location service support by E-UTRAN" Jun. 23, 2009, 3GPP Draft; R2-093906 Location Service Support by E-UTRAN, 3rd Generation Partnership Project (3GPP), Mobile Competence Centre ; 650, Route Des Lucioles ; F-06921 Sophia-Antipolis Cedex ; France , XP050352101 [retrieved on Jun. 23, 2009] the whole document.
Qualcom Europe: "LCS Control Plan Alternatives for EPS, TD S2-085599, 3gpp TSG SA WG2 Meeting #67" 3GPP WG2, [Online]—Aug. 19, 2008 XP002557776 Internet Publication Retrieved from the Internet: URL: http://www.3gpp. org/ftp/tsg-sa/WG2-Arch/TSGS2_67_Sophia-Antipolis/Docs/> [retrieved on Nov. 26, 2009] the whole document.
Nokia Siemens Networks, et al., "SRVCC functionality for emergency calls," S2-093756, 3GPP TSG-SA2 Meeting #73, May 15, 2009.
Qualcomm Europe: "Location Continuity for Handoff of Emergency Calls", S2-091450, 3GPP, Feb. 16, 2009.
Qualcomm Europe: "Location Continuity for SRVCC support of Emergency Calls," S2-091451, 3GPP TSG SA WG2 Meeting #71, Feb. 20, 2009.
Taiwan Search Report—TW099118424—TIPO—Mar. 12, 2013.
Qualcomm Europe et al., "Details on Architectural Alternative #2 for LCS Control Plane Solutions for EPS", 3GPP Draft; S2-088298_e-mail-rev1-S2-088148_(LCS CP solution for EPS—architecture alternative #2), Nov. 29, 2008 3rd Generation Partnership Project (3GPP), Mobile Competence Centre ; 650, route des Lucioles; F-06921 Sophia-Antipolis Cedex ; France, vol. SA WG2, Miami; Nov. 17-Nov. 21, 2008 Nov. 29, 2008 XP050629278 [retrieved on Nov. 29, 2008], 9 pages.
Qualcomm Europe (for RAN2): "LS on 10 Architecture and work split for positioning in LTE", 3GPP Draft; R2-094074, 3rd Generation Partnership Project (3gpp), Mobile Competence Centre ; 650, Route Des Lucioles ; F-06921 Sophia-Antipolis Cedex; France, no. Los Angeles, USA; Jul. 3, 2009, XP050352219, [retrieved on Jul. 3, 2009] 1 Page.
3rd Generation Partnership Project; 1,6,8, Technical Specification Group Services and 13,15 System Aspects; Functional stage 2 description of Location Services (LCS) (Release 7) , 3GPP Standard; 3GPP TS 23.271, 3rd Generation Partnership Project (3GPP), Mobile Competence Centre ; 650, Route Des Lucioles ; F-06921 Sophia-Antipolis Cedex ; France, No. V7.9.0, Sep. 1, 2007, pp. 1-145, XP050363506, chapter 9.2.
Qualcomm Europe: "LCS Control Plane Alternatives for EPS", 3GPP Draft; S2-085599 (LCS Control Plane Solution for EPS), 3rd Generation Partnership Project (3GPP), Mobile Competence Centre ; 650, Route Des Lucioles ; F-06921 Sophia-Antipolis Cedex ; France, vol. SA WG2, no. Sophia Antipolis, France; Aug. 25-Aug. 29, 2008, Aug. 19, 2008, XP050628859, [retrieved on Aug. 19, 2008] * chapter 1.1 chapters 10.2, 10.3 figures 22, 23.

* cited by examiner

US 8,942,660 B2

METHOD AND APPARATUS FOR PERFORMING HANDOVER OF AN EMERGENCY CALL BETWEEN WIRELESS NETWORKS

CLAIM OF PRIORITY UNDER 35 U.S.C. §119

The present Application for Patent claims priority to Provisional U.S. Application Ser. No. 61/184,695, entitled "Emergency Call Handoff from LTE to 1XRTT," filed Jun. 5, 2009, and Provisional U.S. Application Ser. No. 61/231,965, entitled "Emergency Call Handoff from LTE to 1XRTT," filed Aug. 6, 2009, both assigned to the assignee hereof, and expressly incorporated herein by reference.

BACKGROUND

I. Field

The present disclosure relates generally to communication, and more specifically to techniques for supporting emergency calls for user equipments (UEs).

II. Background

Wireless communication networks are widely deployed to provide various communication services such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A UE may communicate with a wireless network for a call, e.g., an emergency call. The UE may be mobile and may be handed over from one wireless network to another wireless network during the call. The terms "handover" and "handoff" are synonymous and are often used interchangeably. It may be desirable to efficiently perform handover of the call and to maintain location services for the UE after handover.

SUMMARY

Techniques for supporting handover of an emergency call between wireless networks of different radio access technologies (RATs) are described herein. A UE may communicate with a first wireless network of a first RAT (e.g., E-UTRA) for an emergency call. The UE may receive an indication to perform handover from the first wireless network to a second wireless network of a second RAT (e.g., 1xRTT).

In an aspect, the UE may send a message comprising an emergency indication to initiate handover to the second wireless network. The emergency indication may comprise an emergency global number, or a reserved emergency number, or a preconfigured number, or a designated indication, which are described below. A designated network entity (e.g., an Interworking Solution Function (IWS) or a Mobile Switching Center (MSC)) in the second wireless network may recognize the emergency call based on the emergency indication. The designated network entity may map the emergency indication to a local emergency number or an Emergency Session Transfer Number for SRVCC (E-STN-SR), which may be used to establish a new incoming call leg to a network server anchoring the emergency call. The network server may replace the current incoming call leg via the first wireless network with the new incoming call leg via the second wireless network for the emergency call. The UE may then communicate with the second wireless network via the network server for the emergency call after handover.

In another aspect, location continuity may be supported for the UE following handover to the second wireless network. The UE may obtain location services via the first wireless network prior to handover and via the second wireless network after handover. The UE may be served by a source serving node (e.g., a Mobility Management Entity (MME)) in the first wireless network prior to handover and by a target serving node (e.g., an MSC) in the second wireless network after handover. An identity of the target serving node may be sent to a location server, which may then update a Location and Routing Function (LRF) serving the UE. The LRF may use the target serving node identity to initiate a location session for the UE, if needed.

Various aspects and features of the disclosure are described in further detail below.

DETAILED DESCRIPTION

Techniques for performing handover of an emergency call between wireless networks of different RATs are described herein. Handover refers to transfer of a radio connection for a UE from one radio access network (RAN) to another RAN. The techniques may be used for various wireless networks such as 3GPP wireless networks defined by an organization named "3rd Generation Partnership Project" (3GPP), 3GPP2 wireless networks defined by an organization named "3rd Generation Partnership Project 2" (3GPP2), and other wireless networks. For clarity, much of the description below is for handover of an emergency call from a 3GPP wireless network to a 3GPP2 wireless network.

The techniques may also be used for different types of calls such as circuit-switched (CS) calls and packet-switched (PS) calls. A CS call is a call in which dedicated resources (e.g., traffic channels) are assigned for the call for its entire duration. A PS call is a call in which data is sent in packets using shared resources. A wireless network may support only CS calls, or only PS calls, or both CS and PS calls.

The techniques may also be used for user plane and control plane location solutions/architectures. A user plane location solution is a location solution that sends messages for location services via a user plane. A user plane is a mechanism for carrying signaling and data for higher-layer applications and employing a user-plane bearer, which is typically implemented with standard protocols such as User Datagram Protocol (UDP), Transmission Control Protocol (TCP), and Internet Protocol (IP). A control plane location solution is a location solution that sends messages for location services via a control plane. A control plane is a mechanism for carrying signaling for higher-layer applications and is typically implemented with network-specific protocols, interfaces, and signaling messages. Messages supporting location services are carried as part of signaling in a control plane location solution and as part of data (from a network perspective) in a user plane location solution. The content of the messages may, however, be the same or similar in both user plane and control plane location solutions.

Figure 1:
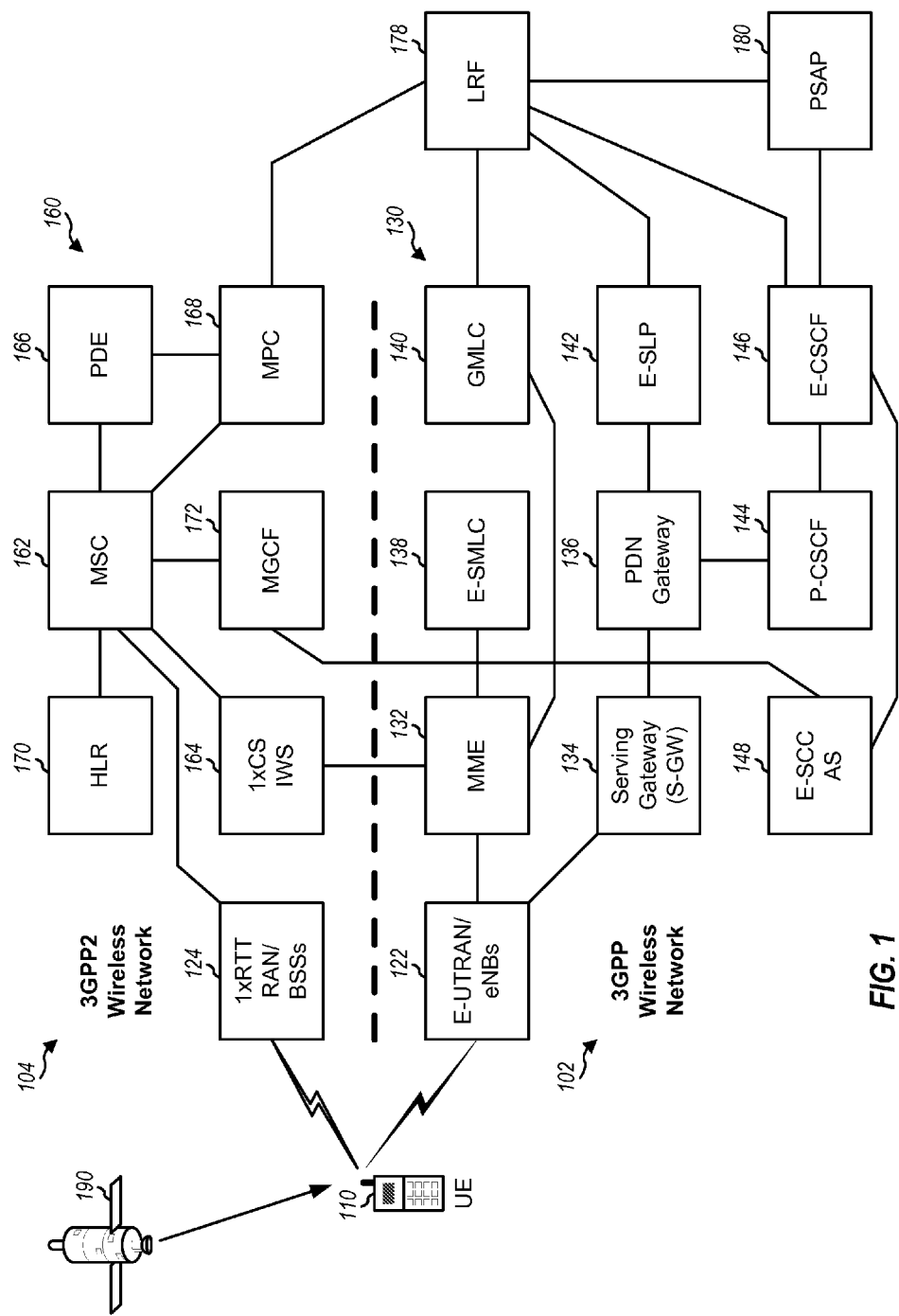
FIG. 1 shows an exemplary deployment of two wireless networks.

FIG. 1 shows an exemplary deployment of a 3GPP wireless network 102 and a 3GPP2 wireless network 104, which may be operated by the same or different network operators. A wireless network may also be referred to as a public land mobile network (PLMN). In general, a wireless network may include (i) a RAN that can support radio communication and (ii) a core network that can support various communication services. 3GPP wireless network 102 includes a RAN 122 and a core network 130. 3GPP2 wireless network 104 includes a RAN 124 and a core network 160. A RAN may also be referred to as an access network, a radio network, etc. A RAN may include base stations and/or other network entities. A base station may also be referred to as a Node B, an evolved Node B (eNB), a base station system (BSS), an access point, etc.

RAN 122 may be an Evolved Universal Terrestrial Radio Access Network (E-UTRAN) that supports Evolved Universal Terrestrial Radio Access (E-UTRA) or a RAN that supports some other RAT. RAT may also be referred to as radio technology, air-link interface, wireless access type, etc. E-UTRA may also be referred to as Long Term Evolution (LTE). E-UTRAN 122 may include eNBs that support radio communication for UEs.

Core network 130 may support various communication services for UEs communicating with RAN 122. Within core network 130, a Mobility Management Entity (MME) 132 may perform various control functions such as mobility management, gateway selection, authentication, bearer management, etc. A serving gateway (S-GW) 134 may perform various functions related to data transfer for UEs such as data routing and forwarding, mobility anchoring, etc. A Packet Data Network (PDN) gateway 136 may perform various functions such as maintenance of data connectivity for UEs, IP address allocation, IP routing, etc.

An Evolved SMLC (E-SMLC) 138 may support positioning for UEs communicating with RAN 122. A Gateway Mobile Location Center (GMLC) 140 may support location services for UEs communicating with RAN 122. An Emergency Secure User Plane Location (SUPL) Location Platform (E-SLP) 142 may include a SUPL Location Center (SLC) and possibly a SUPL Positioning Center (SPC). The SLC may perform various functions for location services, coordinate the operation of SUPL, and interact with SUPL enabled terminals (SETs). The SPC may support positioning for SETs and delivery of assistance data to the SETs and may also be responsible for messages and procedures used for position calculation. GMLC 140 may support a control plane location solution for 3GPP, e.g., TS 23.271. E-SLP 142 may support SUPL. Either the control plane or user plane location solution may be selected to obtain the location of a UE that has a call via RAN 122.

A Proxy Call Session Control Function (P-CSCF) 144 and an Emergency CSCF (E-CSCF) 146 may support IP Multimedia Subsystem (IMS) services, e.g., Voice-over-IP (VoIP). P-CSCF 144 may accept requests from UEs and may service these requests internally or forward them to other entities, possibly after translation. E-CSCF 146 may perform session control services for UEs, may maintain session state used to support IMS emergency services, and may support emergency VoIP calls. An Emergency Service Centralization and Continuity Application Server (E-SCC AS)/Emergency Access Transfer Function (EATF) 148 may support single radio voice call continuity (SRVCC) for emergency calls. With SRVCC, a call can be preserved when handover occurs between a CS RAN and a PS RAN for a UE that cannot access both RANs simultaneously. P-CSCF 144, E-CSCF 146, and E-SCC AS 148 may be part of an IMS network in core network 130.

A Public Safety Answering Point (PSAP) 180 is an entity responsible for answering emergency calls (e.g., for police, fire, and medical services) and may also be referred to as an Emergency Center (EC). An emergency call may be initiated when a user dials some fixed well-known number such as '911' in North America or '112' in Europe. PSAP 180 may support PS calls (e.g., VoIP calls) and Session Initiation Protocol (SIP), which is a signaling protocol for initiating, modifying, and terminating interactive user sessions based on IP. PSAP 180 may also support CS calls.

A Location and Routing Function (LRF) 178 may interface with PSAP 180 and may perform routing functions and support location services (e.g., retrieval of location estimates) for emergency calls. LRF 178 may be assigned when an emergency call is originated in the PS domain, as described in TS 23.167. LRF 178 may be an anchor point for location services and may be maintained after handover. LRF 178 may be implemented external to any location server, as shown in FIG. 1. LRF 178 may also overlap with a location server, e.g., via a connection or via a common physical implementation.

RAN 124 may be a CDMA 1X Radio Transmission Technology (1xRTT) RAN that supports CDMA2000 1X or a RAN that supports some other RAT. 1xRTT may also be referred to as 1X. RAN 124 may include base stations and Base Station Controllers (BSCs), which may provide coordination and control of the base stations.

Core network 160 may support various communication services for UEs communicating with RAN 124. Within core network 160, a Mobile Switching Center (MSC) 162 may perform switching functions for CS calls for UEs communicating with 1xRTT RAN 124. A 1xCS Interworking Solution Function (1xCS IWS) 164 may support interworking between core networks 130 and 160. A Position Determining Entity (PDE) 166 may support positioning for UEs communicating with 1xRTT RAN 124. A Mobile Positioning Center (MPC) 168 may perform various functions to support location services, interface with external location services (LCS) clients, and provide services such as subscriber privacy, authorization, authentication, billing, etc. MPC 168 may support a control plane location solution for 3GPP2, e.g., ANSI J-STD-036, 3GPP2 X.S0002, etc.

A Home Location Register (HLR) 170 may store subscription information for UEs that have service subscription with 3GPP2 wireless network 104. A Media Gateway Control Function (MGCF) 172 may support conversion between SIP/IP and Call Signaling such as SS7 for a Public Switched Telephone Network (PSTN) and may control a Media Gateway (MGW) (not shown in FIG. 1) that converts between CS voice and PS voice. MGCF 172 may be used for a VoIP call to a PSTN user (e.g., PSAP 180) or for a CS call or CS call leg to a VoIP user or entity (e.g., E-SCC AS 148).

FIG. 1 shows some network entities that may be included in each wireless network. FIG. 1 also shows some interface between the various network entities. Each wireless network may include other network entities and interfaces that can support other functions and services.

A UE 110 may communicate with wireless network 102 or 104 to obtain communication services. UE 110 may be stationary or mobile and may also be referred to as a mobile station, an access terminal, a SET, a subscriber unit, a station, etc. UE 110 may be a cellular phone, a personal digital assistant (PDA), a wireless device, a wireless modem, a wireless router, a laptop computer, a telemetry device, a tracking device, etc. UE 110 may communicate with base stations in E-UTRAN 122 or 1xRTT RAN 124. UE 110 may support SRVCC and may be able to communicate with either E-UTRAN 122 or 1xRTT RAN 124 at any given moment.

UE 110 may also receive and measure signals from one or more satellites 190 and obtain pseudo-range measurements for the satellites. UE 110 may also measure signals from base stations in RAN 122 and/or RAN 124 and may obtain timing measurements, signal strength measurements, and/or signal quality measurements for the base stations. The pseudo-range measurements, timing measurements, signal strength measurements, and/or signal quality measurements may be used to derive a location estimate for terminal 110. A location estimate may also be referred to as a position estimate, a position fix, etc.

Satellites 190 may be part of the United States Global Positioning System (GPS), the European Galileo system, the Russian GLONASS system, or some other satellite positioning system (SPS). An SPS typically includes a system of transmitters positioned to enable receivers to determine their location on or above the Earth based on signals received from the transmitters.

UE 110 may initially communicate with PSAP 180 via 3GPP wireless network 102 for an IMS emergency call, which is an emergency call via an IMS network. The emergency call may be anchored in E-SCC AS 148 and may include (i) an incoming call leg from UE 110 to E-SCC AS 148 via E-UTRA access and (ii) an outgoing call leg from E-SCC AS 148 to PSAP 180. E-SCC AS 148 may support voice call continuity for UEs and may provide capabilities to transfer voice calls between CS domain and PS domain.

UE 110 may be mobile and may leave the coverage of 3GPP wireless network 102 and enter the coverage of 3GPP2 wireless network 104. For handover, network entities prior to handover are in a source side, and network entities after handover are in a target side. An SRVCC handover procedure may be performed to handover the emergency call from E-UTRAN 122 to 1xRTT RAN 124. For the SRVCC handover procedure, MME 132 in 3GPP wireless network 102 may communicate with 1xCS IWS 164 in 3GPP2 wireless network 104 to originate a new CS call leg in 1xRTT RAN 124 and MSC 162. MSC 162 may also initiate a session transfer, and E-SCC AS 148 may switch data path for the emergency call for UE 110 from the current PS call on the source/3GPP side to the new CS call on the target/3GPP2 side. After the data path switch, UE 110 may communicate voice data via 1xRTT RAN 124, MSC 162, and other entities (e.g., an MGW) in core network 160 for the emergency call.

For handover with SRVCC, the current incoming call leg used for signaling from UE 110 to E-SCC AS 148 on the source/E-UTRA access side may be replaced by the new incoming call leg from UE 110 to E-SCC AS 148 on the target/1xRTT access side. The current incoming call leg may be supported by, and may go through, E-UTRAN 172, S-GW 134, PDN Gateway 136, P-CSCF 144, E-CSCF 146, and E-SCC AS 148. The new incoming call leg may be supported by, and may go through, 1xRTT RAN 124, MSC 162, MGCF 172, E-SCC AS 148, and optionally an Interrogating CSCF (I-CSCF) connecting MGCF 172 to E-SCC AS 148 (not shown in FIG. 1). The outgoing call leg from E-SCC AS 148 to PSAP 180 may remain the same but may be updated with new information (e.g., a new IP address) regarding the new incoming call leg.

E-SCC AS 148 may perform functions to handover the emergency call to the appropriate domain as UE 110 moves about. E-SCC AS 148 may allow UE 110 to move between CS domain and PS domain by "calling into" E-SCC AS 148 and moving the emergency call to the new domain. The emergency call for UE 110 may be associated with an Emergency Session Transfer Number for SRVCC (E-STN-SR). E-STN-SR is a number (e.g., a telephone number) defined by the operator of core network 130 that is associated with E-SCC AS 148 and may be configured in or otherwise provided by UE 110, or 1xCS IWS 164, or LRF 178 as described below. The E-STN-SR for the emergency call may point toward E-SCC AS 148 and may enable routing of the new incoming call leg from MSC 162 to E-SCC AS 148 via MGCF 172 and optionally an I-CSCF.

To successfully perform the SRVCC handover procedure, a designated network entity in 3GPP2 wireless network 104 should be provided with either the E-STN-SR or information that can be used to ascertain the E-STN-SR for the emergency call. This would allow the emergency call to be routed to the appropriate E-SCC AS anchoring the emergency call. For example, MSC 162 may need the E-STN-SR to originate a new CS call to E-SCC AS 148 for handover.

In an aspect, UE 110 may be preconfigured with an emergency number that may be used to initiate handover of an emergency call. The preconfigured emergency number may be any number that can be recognized and routed by MSC 162. For example, the preconfigured emergency number may be a reserved E-STN-SR or a dialable or non-dialable number that has been assigned to the operator of 3GPP2 wireless network 104 or has been agreed for common use by more than one network operator. The preconfigured emergency number may be used for a specific wireless network or for a number of wireless networks (e.g., a specific 3GPP2 1X wireless network or all 1X wireless networks). UE 110 may include the preconfigured emergency number in a message to originate handover of the emergency call. MSC 162 may detect the preconfigured emergency number and may replace it with a valid E-STN-SR associated with E-SCC AS 148. This may occur as part of normal number translation and routing and does not require MSC 162 to recognize the number as belonging to an emergency call. A CS call may then be originated by MSC 162 to E-SCC AS 148 based on the E-STN-SR.

In another aspect, UE 110 may be preconfigured with an emergency global number (EGN), which may be applicable for some or all network operators. This EGN may be any number that may be recognized as being for emergency calls. The EGN may differ from other Session Transfer Number for SRVCC (STN-SRs) in order to avoid confusion with handover of a non-emergency call. The EGN may or may not differ from dialed numbers. For example, the EGN may be (i) a dialable or non-dialable number assigned to the operator of wireless network 104, or (ii) a number that is invalid according to existing standards for 3GPP2 wireless networks (e.g., a number containing a string of digits not assigned to any network or to any user), or (iii) a valid dialable number or a valid emergency number agreed by network operators to designate an emergency call handover. In another design, UE 110 may use a special indication for handover of emergency calls. This special indication may be an empty called party number or some other indication. UE 110 may include the EGN as a called party number (or the special indication) in an origination message for SRVCC handover for an emergency call. 1xCS IWS 164 may recognize the EGN (or special indication) in the origination message and may replace the EGN (or special indication) with either (i) the E-STN-SR if a control plane location solution was used on the source side or (ii) a local (e.g., 911) emergency number. The EGN may be recognized by 1xCS IWS 164 as signifying an emergency call handover. The local emergency number may be recognized by MSC 162 as signifying an emergency call origination. MSC 162 may not be aware that an emergency call is being handed over from E-UTRAN 122 whereas 1xCS IWS 164 may be aware of the handover. Replacement with the local emergency number may be preferred if a user plane location solution was used on the source side and may also be valid if a control plane location solution was used on the source side. If the local emergency number is used, then MSC 162 may obtain the E-STN-SR from MPC 168 as an extension of a normal emergency call procedure defined in J-STD-036B. In any case, the emergency call may be routed to E-SCC AS 148 based on the E-STN-SR.

Table 1 summarizes various schemes for supporting handover of an emergency call. Each row of Table 1 covers a scheme for supporting handover of an emergency call. For each scheme, UE 110 may send information that may be used to complete the handover in 3GPP2 wireless network 104. A designated network entity (e.g., MSC 162 or 1xCS IWS 164) may act on the information received from UE 110. The action performed by the designated network entity may entail (i) replacing the information received from UE 110 with the E-STN-SR or a local emergency number (e.g., a 911 number) and/or (ii) performing some other action.

UE 110 may receive the request message from E-UTRAN 122 and may instigate an 1xRTT call origination that may be tunneled to 1xCS IWS 164 by E-UTRAN 122 and MME 132 (steps 5 to 7). UE 110 may send an Uplink (UL) Handover Preparation Transfer message to E-UTRAN 122 to initiate establishment of a CS access leg (step 5). This transfer message may include a Mobile Equipment Identity (MEID) of UE 110, a 1X Call Origination message having a called party number (CdPN) field set to the EGN, a Request-Type field set to "emergency handover" to indicate emergency voice service continuity, etc. E-UTRAN 122 may receive the transfer message from UE 110 and may send an Uplink S1 cdma2000 Tunneling message to MME 132 (step 6). The tunneling message may include the MEID, the 1X Origination message with the CdPN field set to the EGN, a reference cell identity (ID) identifying a target 1xRTT serving cell, a cdma2000 Handover (HO) Required Indication to indicate to MME 132 that handover preparation has started, etc.

MME 132 may receive the tunneling message from E-UTRAN 122 and may select 1xCS IWS 164 based on the reference cell ID. MME 132 may then send a S102 Direct Transfer message to the selected 1xCS IWS 164 (step 7). This transfer message may include the MEID, the 1X Origination message with the CdPN field set to the EGN, etc.

1xCS IWS 164 may receive the transfer message from MME 132 and may obtain the EGN from the 1X Origination message. 1xCS IWS 164 may recognize that this is a request for handover of an emergency call from the presence of the EGN. 1xCS IWS 164 may then replace the EGN in the CdPN with the E-STN-SR and may send the modified 1X Origination message containing the new CdPN to MSC 162 (step 8).

TABLE 1

| UE sends . . . | Designated Network Entity | Action by Designated Network Entity |
|---|---|---|
| Preconfigured Emergency Number | MSC | Replace preconfigured emergency number with E-STN-SR. Perform actions to set up a normal call using the E-STN-SR to route to the E-SCC AS. |
| '911' | MSC | Perform action to set up emergency call. Obtain the E-STN-SR from the MPC as an extension of normal emergency call setup and route the call to the E-SCC AS using the E-STN-SR. |
| EGN or Special Indication | 1x CS IWS | Replace EGN or special indication with E-STN-SR (for control plane on source side). Transfer the call to the MSC for normal call setup using the E-STN-SR for routing. |
| EGN or Special Indication | 1x CS IWS | Replace EGN or special indication with local emergency number (for control plane or user plane location solution on source side). Transfer the call to the MSC as an emergency call. |

Figure 2A:
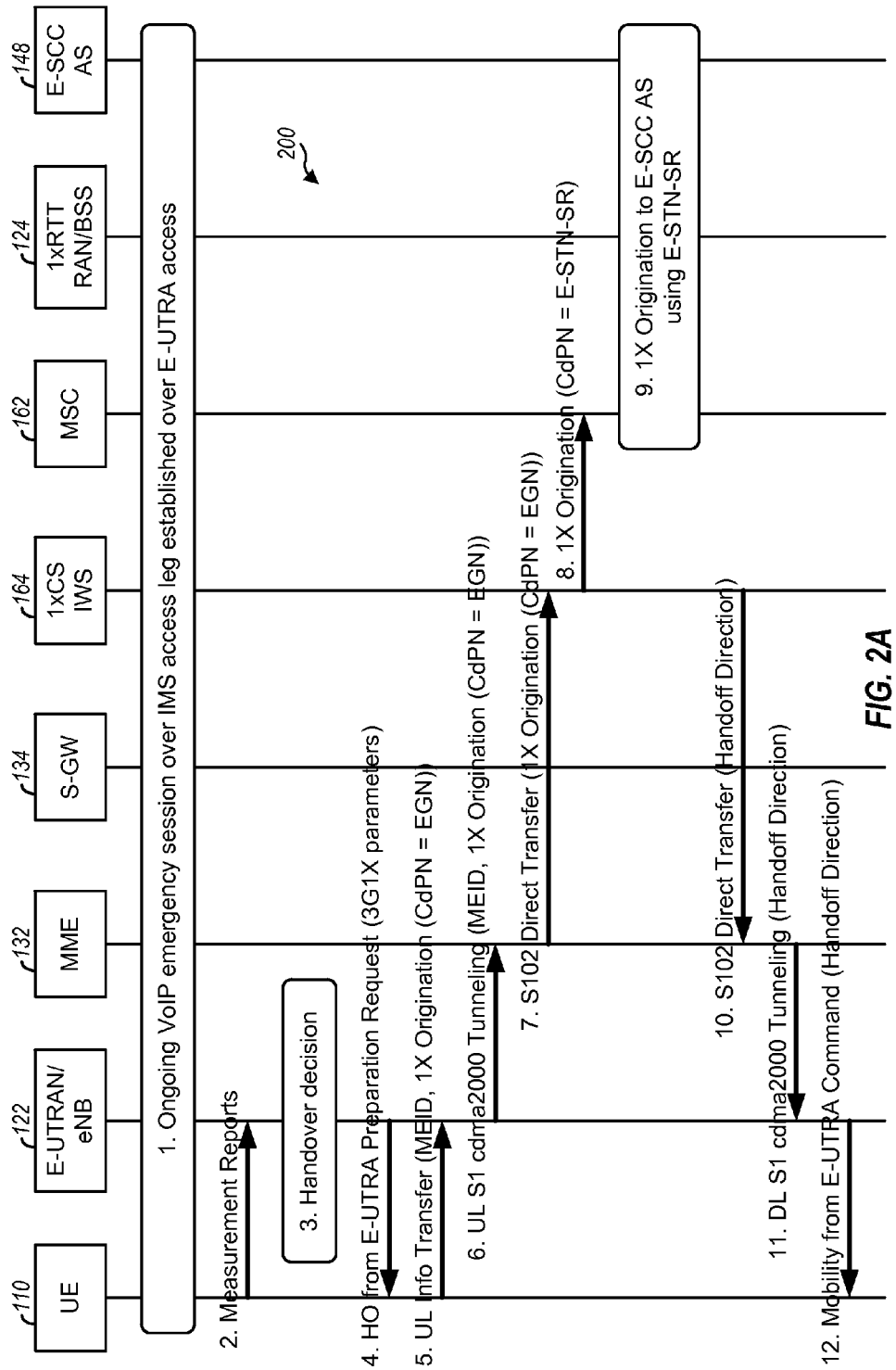
FIGS. 2A and 2B show a design of a handover procedure for an emergency call.
Figure 2B:
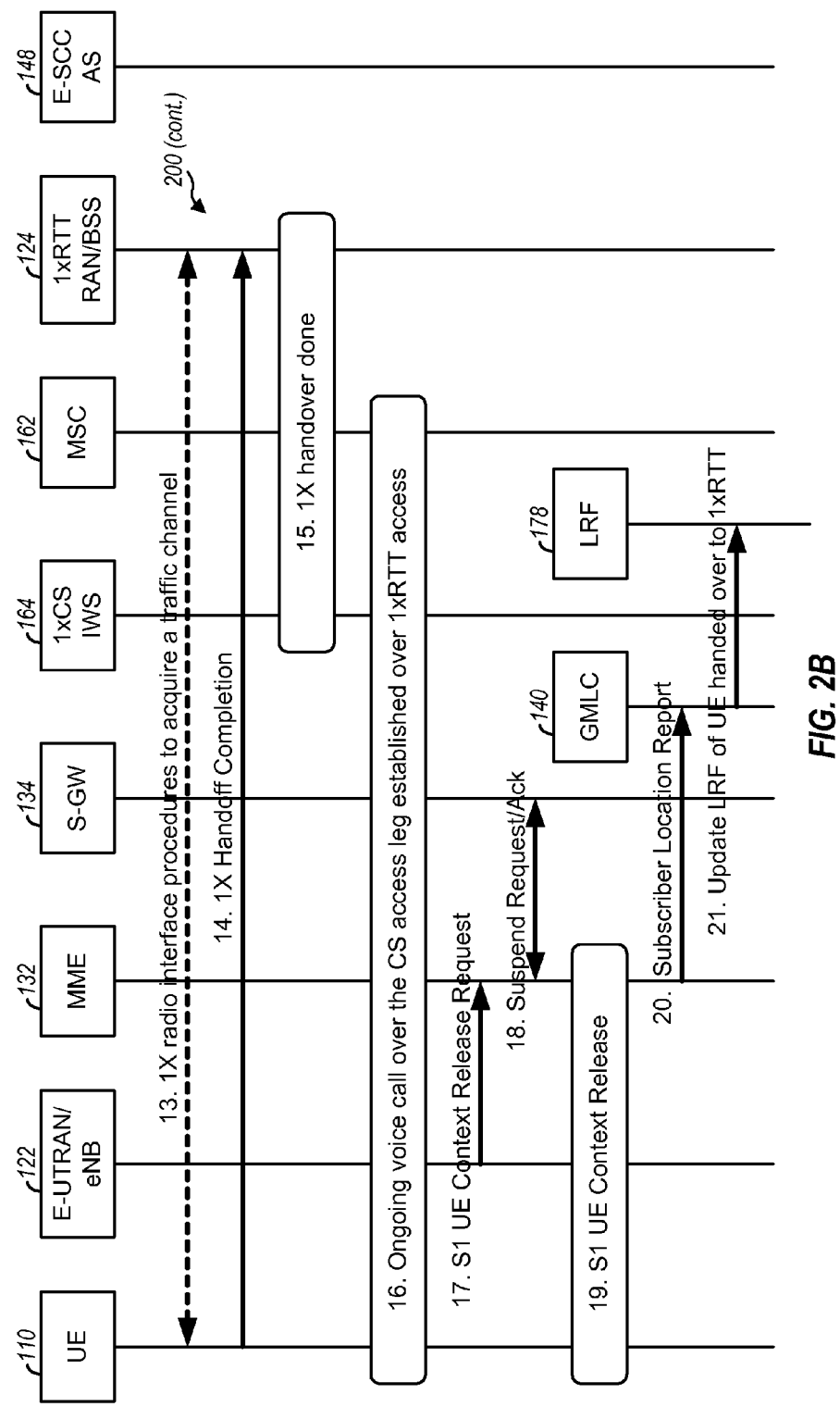

FIGS. 2A and 2B show a design of a message flow 200 for handover of an emergency call with UE 110 sending an EGN in an origination message. UE 110 may have an emergency call through an ongoing VoIP session over an IMS access leg established over E-UTRA access (step 1). UE 110 may periodically send pilot measurement reports for nearby 1xRTT base stations to a serving base station/eNB in E-UTRAN 122 (step 2). E-UTRAN 122 may receive the pilot measurement reports and, based on some trigger (e.g., good signal strength at the UE for some nearby 1xRTT base stations and poor signal strength for the serving base station), may make a handover decision to initiate an inter-RAT handover to 1xRTT (step 3). E-UTRAN 122 may then send a Handover (HO) from E-UTRA Preparation Request message to direct UE 110 to perform an inter-RAT handover (step 4). This message may include pertinent parameters for 1xRTT RAN 124 and/or other information.

MSC 162 may perceive and treat this as a normal 1X Call Origination over 1xRTT air interface and may then establish a CS call leg for UE 110 to E-SCC AS 148 by routing the call to E-SCC AS 148 using the E-STN-SR in the CdPN (step 9). During step 9, a data path for the new call leg may be created, and E-SCC AS 148 may associate the new incoming call leg to the outgoing call leg to PSAP 180, update the outgoing call leg, and release the previous incoming call leg through E-UTRAN 122.

In order to complete the handover of UE 110 to the target 1xRTT cell, 1xCS IWS 164 may tunnel a handover request to UE 110 via MME 132 and E-UTRAN 122 (steps 10 to 12). 1xCS IWS 164 may return to MME 132 a S102 Direct Transfer message containing a 1X Handover Direction message and a handover indicator indicating whether or not handover was successful (step 10). MME 132 may return to E-UTRAN 122 a downlink S1 cdma2000 Tunneling message with the 1X Handover Direction message and the handover indicator (step 11). If handover was successful, then E-UTRAN 122 may send to UE 110 a Mobility from E-UTRA Command message carrying the Handoff Direction message, as shown in FIG. 2A (step 12), which UE 110 may perceive as a command to handover to the target 1xRTT cell. Otherwise, if handover was not successful, then E-UTRAN 122 may send to UE 110 a Downlink Information Transfer message carrying a 1X message that indicates handover failure (not shown in FIG. 2A).

Referring now to FIG. 2B, UE 110 may receive traffic channel information for 1xRTT RAN 124 and may perform handover to the target 1xRTT cell in 1xRTT RAN 124 (steps 13 to 15). UE 110 may tune to 1xRTT RAN 124 and perform traffic channel acquisition with 1xRTT CS access to the target 1xRTT cell (step 13). UE 110 may send a 1X Handoff Completion message to 1xRTT RAN 124 (step 14). 1xRTT RAN 124 may send a message to MSC 162 to indicate completion of handover to the target 1xRTT cell, and MSC 162 may then release the call connection to 1xCS IWS 164 (step 15). The ongoing emergency call over the CS access leg is then established over 1xRTT access (step 16).

E-UTRAN 122 may send an S1 UE Context Release Request message to MME 132 to indicate S1 release procedure caused by successful handover from E-UTRA to 1xRTT (step 17). MME 132 may deactivate any guaranteed bit rate (GBR) bearers for UE 110 and may exchange Suspend Request/Acknowledge messages with serving gateway 134 and PDN gateway 136 (step 18) in order to suspend any non-GBR bearers for UE 110. S1 UE Context in E-UTRAN 122 may then be released (step 19).

For an emergency service session after handover is complete, if a control plane location solution was used on the source side, then MME 132 may send a Subscriber Location Report carrying an indication of MSC 162 (e.g., the target 1xRTT cell ID) to GMLC 140 associated with the source side (step 20). This may enable location continuity on the 1xRTT side for UE 110 after handover of the emergency call. Alternatively, if the control plane location solution was not used on the source side, then location continuity procedures may be instigated on the 1xRTT side, as described below. If step 20 occurs, then LRF 178 may be updated by GMLC 140 of UE 110 being handed over to 1xRTT (step 21).

FIGS. 2A and 2B show a design in which 1xCS IWS 164 replaces the EGN for the called party number with the E-STN-SR. In another design, 1xCS IWS 164 may forward the 1X Origination message to MSC 162, which may then replace the EGN with the E-STN-SR. MSC 162 may translate the EGN to the E-STN-SR as part of number translation and call routing. Alternatively, MSC 162 may obtain the E-STN-SR from MPC 168 as an extension of a normal emergency call procedure, as described below. This design may support more than one E-SCC AS per network operator.

Figure 3:
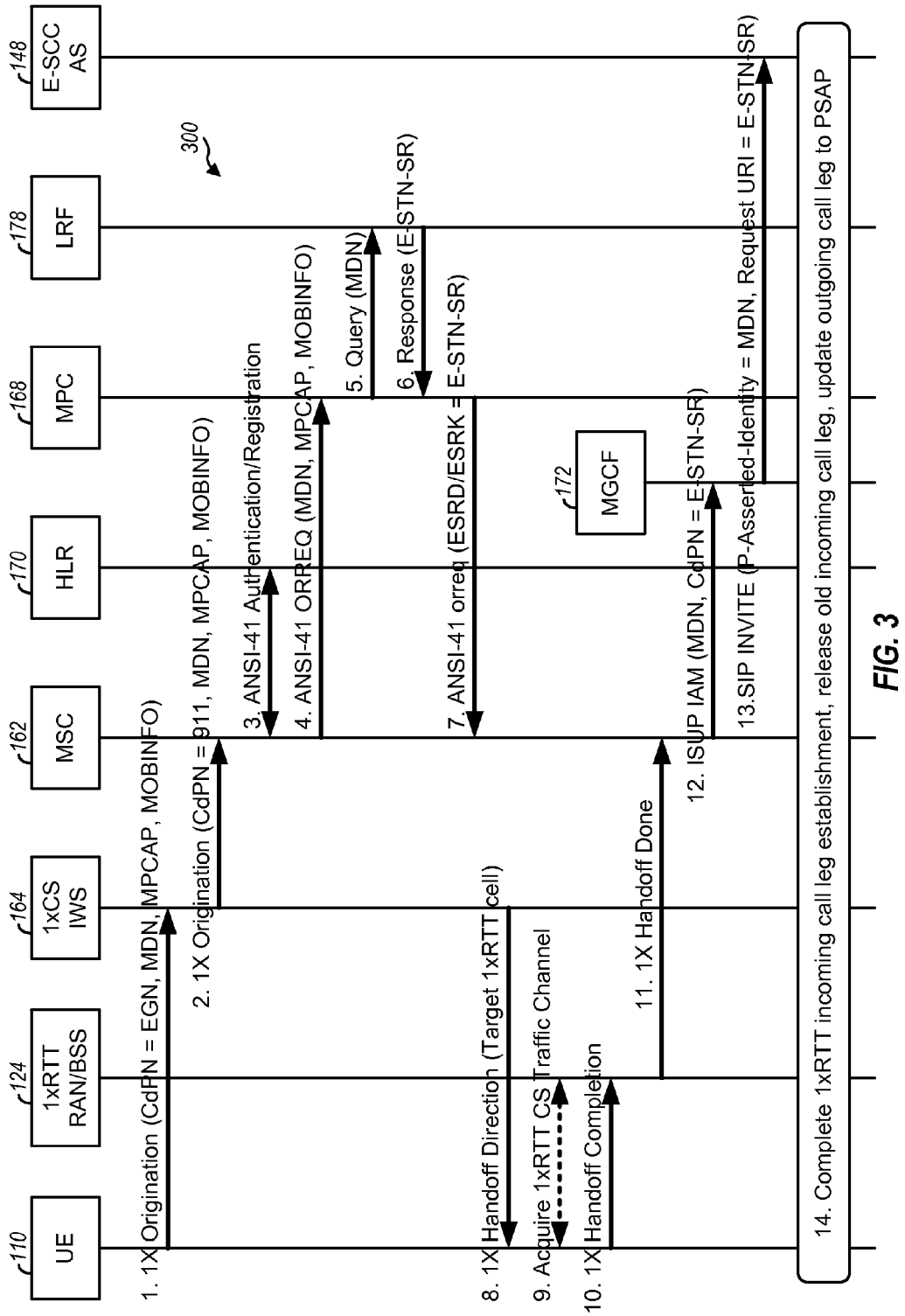
FIG. 3 shows another design of a handover procedure for an emergency call.

FIG. 3 shows a design of a message flow 300 for handover of an emergency call with UE 110 sending an EGN in an origination message. UE 110 may have an emergency call through an ongoing VoIP session over an IMS access leg established over E-UTRAN access 122 (not shown in FIG. 3). E-UTRAN 122 may decide to instigate handover of UE 110 to a target 1xRTT cell as described for steps 2, 3 and 4 in FIG. 2A but not shown in FIG. 3. UE 110 may then send a 1X Origination message to start the handover from E-UTRA to 1xRTT (step 1). The 1X Origination message may include a Mobile Directory Number (MDN) of UE 110, the CdPN field set to the EGN (or a special indication of emergency call handover), position capabilities (MPCAP) of UE 110, mobile information (MOBINFO), etc. Step 1 may correspond to steps 5, 6 and 7 in FIG. 2A, which shows more details of the message transfer from UE 110 to 1xCS IWS 164. 1xCS IWS 164 may receive the 1X Origination message, recognize from the presence of the EGN that this is a request for handover of an emergency call, replace the EGN with a local emergency number (e.g., 911), and send the modified message to MSC 162 (step 2). Alternatively, if some other emergency indication is included in the 1X Origination message instead of an EGN, then MSC 162 may add a CdPN containing a local emergency number in the 1X Origination message and forward this message to MSC 162 in step 2. MSC 162 may register and authenticate UE 110 using ANSI-41, e.g., as defined for non-emergency SRVCC (step 3). MSC 162 may recognize the emergency number in the 1X Origination message and may perform emergency call processing in the normal manner. MSC 162 may send an ANSI-41 Origination Request (ORREQ) message to query MPC 168 for routing instructions (step 4).

MPC 168 may receive the request message from MSC 162 and may query LRF 178 (assuming intra-operator handover) and provide the identity (e.g., MDN) of UE 110 and the identity of MSC 162 (step 5). LRF 178 may find a location record for UE 110, which may have been created earlier when the emergency call was originated on the E-UTRAN side. The location record may include the E-STN-SR associated with E-SCC AS 148, which may have been sent by E-CSCF 146 to LRF 178 during call origination for the emergency call for the case that source core network 130 contains more than one E-SCC AS. Alternatively, if source core network 130 contains just one E-SCC AS, then LRF 178 may be configured with the E-STN SR for this E-SCC AS which will be applicable to any call handover from source 3GPP wireless network 102 to target 3GPP2 wireless network 104. LRF 178 may return the E-STN-SR associated with E-SCC AS 148 to MPC 168 (step 6). Alternatively, when there is only one E-SCC AS, LRF 178 may indicate to MPC 168 in step 6 that a call record was found for UE 110 but not return an E-STN-SR, and MPC 168 may determine the E-STN-SR (which may be configured in MPC 168). MPC 168 may query LRF 178 for both normal emergency call and 1X SRVCC handover since these two cases may be indistinguishable by MSC 162 and MPC 168. For a normal emergency call, LRF 178 would not find a previous call record for UE 110 and may then indicate this to MPC 168, which may then perform normal emergency call treatment (not shown in FIG. 3).

MPC 168 may return to MSC 162 an ANSI-41 Origination Response (orreq) message with an Emergency Services Routing Key (ESRK) or Emergency Services Routing Digit (ESRD) field set to the E-STN-SR (step 7). An ESRD is a non-dialable directory number used to identify and route to a PSAP. An ESRK is a non-dialable directory number used to identify and route to a PSAP as well as to identify the emergency call. Each PSAP may be associated with one ESRD as well as a pool of ESRKs. One ESRK from the pool may be assigned to a UE for the duration of an emergency call. The emergency call may then be routed to the PSAP based on the ESRK or ESRD. MPC 168 may suppress normal location query that would typically be instigated for an emergency call origination.

In parallel with steps 2 to 7, 1xCS IWS 164 may instigate handover of UE 110 to the target 1xRTT cell (step 8). Step 8 may correspond to steps 10, 11 and 12 in FIG. 2A, which shows more details of the handover instigation omitted in FIG. 3. Handover may continue in steps 9 to 11 and may be completed before or after step 12. MSC 162 may continue emergency call setup by sending an ISDN User Part Initial Address Message (ISUP IAM) to MGCF 172 using the E-STN-SR received in step 7 as the called party number (step 12). MGCF 172 may convert the ISUP IAM into a SIP INVITE and may send the SIP INVITE to E-SCC AS 148 either directly (step 13) or via an I-CSCF (not shown in FIG. 3). E-SCC AS 148 may locate the original call record and may continue to establish the new incoming 1xRTT call leg, release the old incoming E-UTRA call leg, and update the outgoing call leg to PSAP 180 (step 14).

FIGS. 2A, 2B and 3 show two exemplary designs of message flows supporting handover of an emergency call. Handover of an emergency call may also be supported in other manners. For example, UE 110 may include a preconfigured emergency number, or a preconfigured number, or a special indication in the 1X Origination message. MSC 162 (instead of 1xCS IWS 164) may replace the indication included by UE 110 in the 1X Origination with the E-STN-SR or the local emergency number.

It may be desirable to maintain location continuity for UE 110 following handover of the emergency call from 3GPP wireless network 102 to 3GPP2 wireless network 104. Location continuity refers to the ability to continue to support location services for the UE after handover from one wireless network to another wireless network. Location continuity may be especially desirable for an emergency call, so that an initial location estimate and/or updated location estimates for the UE can be provided to a PSAP servicing the emergency call.

In one design, the following actions may be performed in order to maintain location continuity for UE 110 following handover:

1. Removal of a source location server if different from a target location server,
2. Assignment of the target location server if different from the source location server,
3. If control plane location solution is supported by the target location server, provision of the target location server with an identity of the target serving node and possibly a target cell ID, and
4. If SUPL is supported by the target location server but not by the source location server, provision of the E-SLP with means to access UE 110 (e.g., an IP address assigned to UE 110) and possibly means to support mutual authentication.

Figure 4:
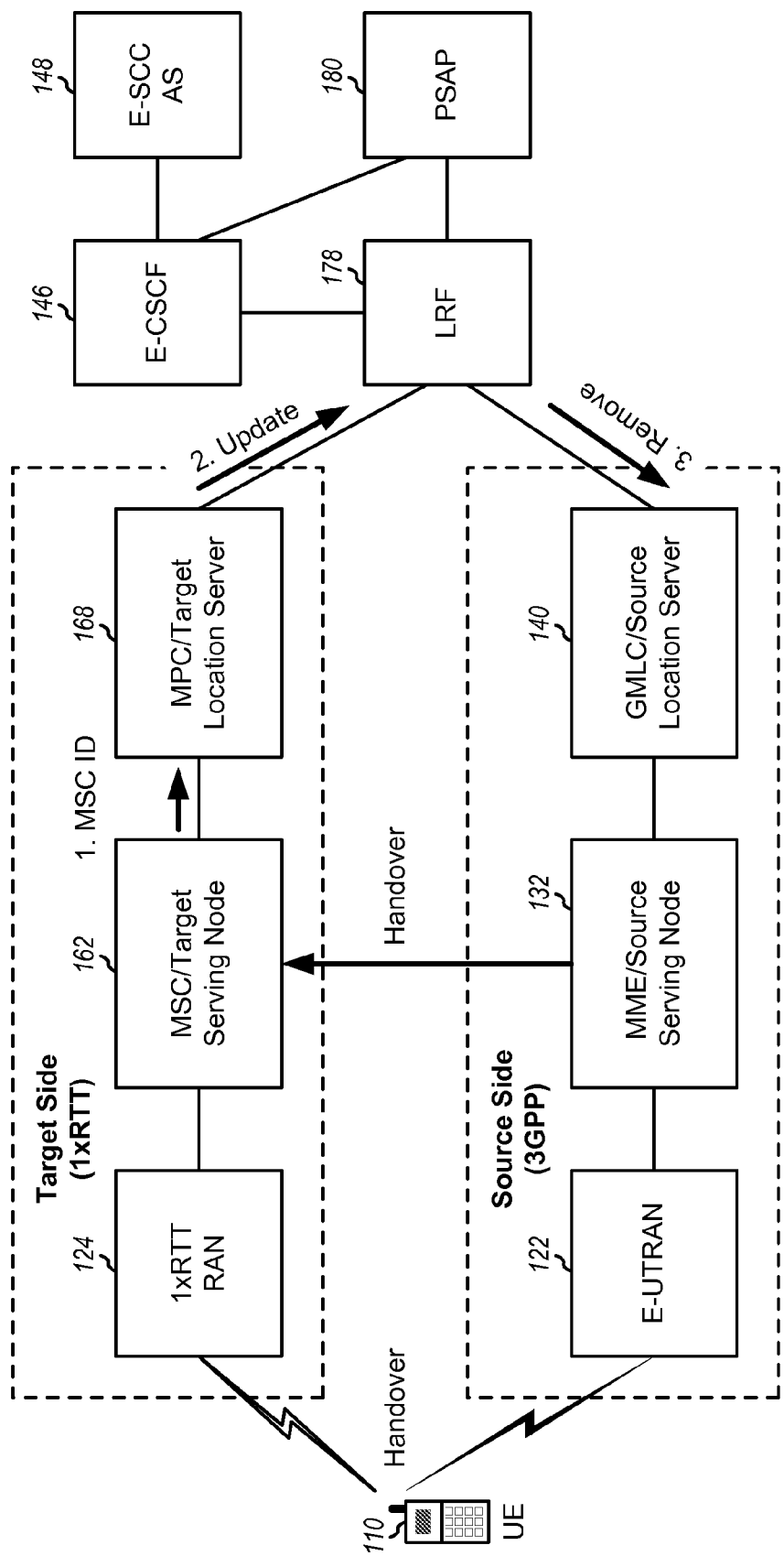
FIGS. 4 and 5 show two designs of maintaining location continuity for a UE following handover.

FIG. 4 shows a design of a first scheme for maintaining location continuity for UE 110 following handover of an emergency call using target side update. The first scheme may be used for handover scenarios in which a control plane location solution is used on the target side and either a control plane location solution or a user plane location solution is used on the source side. The first scheme may be used for message flow 300 in FIG. 3.

As shown in FIG. 4, UE 110 may communicate with E-UTRAN 122, may be served by MME 132 as a source serving node, and may be served by GMLC 140 (as shown in FIG. 4) or E-SLP 142 as a source location server on the source side prior to handover. UE 110 may communicate with 1xRTT RAN 124, may be served by MSC 162 as a target serving node, and may be served by MPC 168 as a target location server on the target side after handover.

UE 110 may perform handover from E-UTRAN 122 to 1xRTT RAN 124. MME 132 may also perform handover for UE 110 with MSC 162. MSC 162 may identify MPC 168 as the target location server, e.g., based on configuration information stored at MSC 162 or a Domain Name System (DNS) query. MSC 162 may transfer its identity (e.g., its address) in an ANSI-41 ORREQ message to MPC 168 during handover or when handover is complete (step 1). MPC 168 may determine whether it is the source location server for UE 110, e.g., may determine whether it acts as GMLC 140 in the case that a control plane location solution is used on the source side, by looking for a call record for UE 110 if call records are maintained. If MPC 168 is the source location server for UE 110, then the remaining steps may be skipped. Otherwise, MPC 168 may update LRF 178 with information on the handover (step 2). For example, MPC 168 may provide the identity of MSC 162 and the identity of UE 110 to LRF 178. LRF 178 may receive the update from MPC 168 and may look for and find a location record for UE 110 that was created when the VoIP emergency call was first originated on the source E-UTRAN side. LRF 178 may then remove the source location server/GMLC 140 or E-SLP 142 (step 3).

Alternatively, UE 110 and 1xCS IWS 164 may originate a 1X emergency call from the perspective of MSC 162 as part of handover, e.g., similar to origination of a normal call for handover. This may then cause MSC 162 to query MPC 168 as part of normal 1X emergency call origination, e.g., as shown by step 4 in FIG. 3. MPC 168 then may return an ESRK number or an ESRD number. However, MPC 168 may determine that the query from MSC 162 is to support handover of an emergency call for UE 110 to 1xRTT, e.g., MPC 168 may query LRF 178 to determine that a record for an emergency call for UE 110 already exists in LRF 178 as shown for steps 5 and 6 in FIG. 3. MPC 168 may then set the ESRK or ESRD number to the E-STN-SR (e.g., an E-STN-SR provided by LRF 178 as shown for step 6 in FIG. 3) and return this to MSC 162 (e.g., as shown for step 7 in FIG. 3). As part of normal emergency call setup according to J-STD-036, MSC 162 may route the call based on the E-STN-SR, and the call may be transferred to E-SCC AS 148.

As shown in FIG. 4, for target side update, MSC 162 may update LRF 178 via MPC 168 by treating the handed over emergency call like a new 1X emergency call origination. MPC 168 may provide the identity of UE 110 (e.g., the MDN) and the identity of MSC 162 to LRF 178 in step 2 in FIG. 4, which may correspond to step 5 in FIG. 3. Location continuity for UE 110 after handover may be supported because LRF 178 can discover that UE 110 has handed over to 1xRTT as a result of the update by MPC 168. LRF 178 may then direct future location requests for PSAP 180 to MPC 168.

Figure 5:
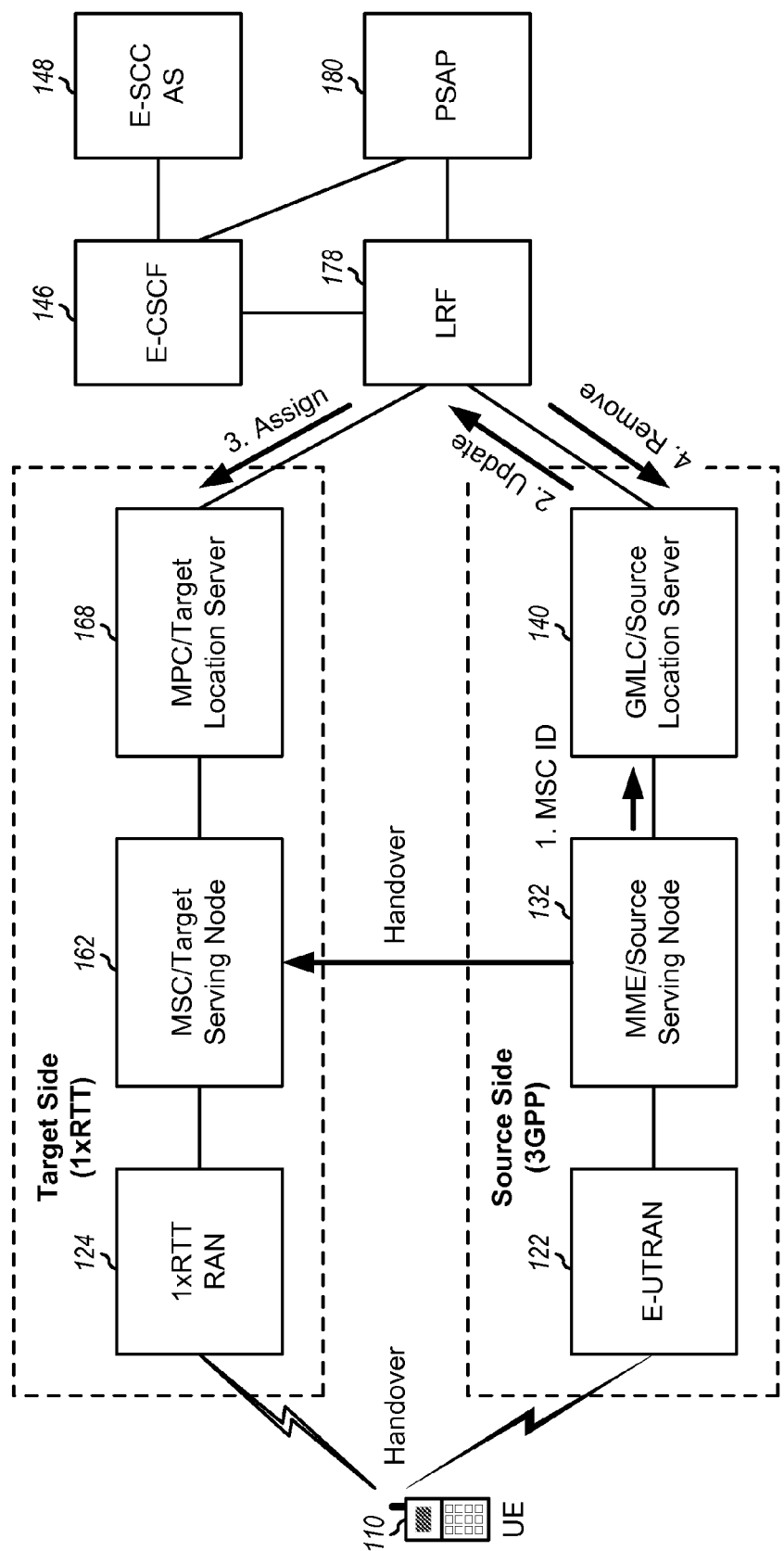

FIG. 5 shows a design of a second scheme for maintaining location continuity for UE 110 following handover of an emergency call using source side update. The second scheme may be used for handover scenarios in which a control plane location solution is used on the source side and a control plane or a user plane location solution is used on the target side. The second scheme may be used for message flow 200 in FIGS. 2A and 2B.

As shown in FIG. 5, UE 110 may communicate with E-UTRAN 122, may be served by MME 132 as a source serving node, and may be served by GMLC 140 as a source location server prior to handover. UE 110 may communicate with 1xRTT RAN 124, may be served by MSC 162 as a target serving node, and may be served by MPC 168 as a target location server after handover.

For the second scheme, MME 132 may transfer the identity of UE 110 and the identity of MSC 162 or a reference to MSC 162 (e.g., the target 1xRTT cell identity) to GMLC 140 after handover is complete (step 1). Step 1 may correspond to step 20 in FIG. 2B. If GMLC 140 maintains call records and can determine that it will be the target location server (e.g., MPC 168), then the subsequent steps may be skipped. Otherwise, GMLC 140 may update LRF 178 with information on the handover, e.g., provide the identity of UE 110 and the identity of, or a reference to, MSC 162 (step 2). Step 2 may correspond to step 21 in FIG. 2B. LRF 178 may determine and assign MPC 168 as the target location server for UE 110. If the target location server/MPC 168 is different from the source location server/GMLC 140, then LRF 178 may provide MPC 168 with information about UE 110 and MSC 162 (step 3). LRF 178 may then remove GMLC 140 if it is not the target location server (step 4). MPC 168 may communicate with MSC 162 based on the information received from LRF 178. For example, if LRF 178 receives a request from PSAP 180 for the location of UE 110 after handover to the target 1xRTT side is complete, then LRF 178 may forward the location request to MPC 168. MPC 168 may then employ normal procedures to obtain location as defined in 3GPP2 X.S0002, which may or may not include querying the address of MSC 162 from the home HLR of UE 110 (e.g., need not include such a query if LRF 178 provides the address of MSC 162 to MPC 168). The procedures to obtain the location of UE 110 and return it to PSAP 180 may involve interactions between MPC 168, PDE 166, MSC 162 and UE 110, as defined in X.S0002.

In FIG. 5, for source side update, MME 132 may update GMLC 140 after handover and may provide (i) the ID of MSC 162, which may be determined based on the target 1xRTT cell, or (ii) the ID of 1xCS IWS 164, or (iii) a target reference cell. Location continuity on the target side may then follow the 1X solution in X.S0002.

FIGS. 4 and 5 show two exemplary schemes for maintaining location continuity for UE 110 following handover of an emergency call. Location continuity may also be maintained in other manners.

Figure 6:
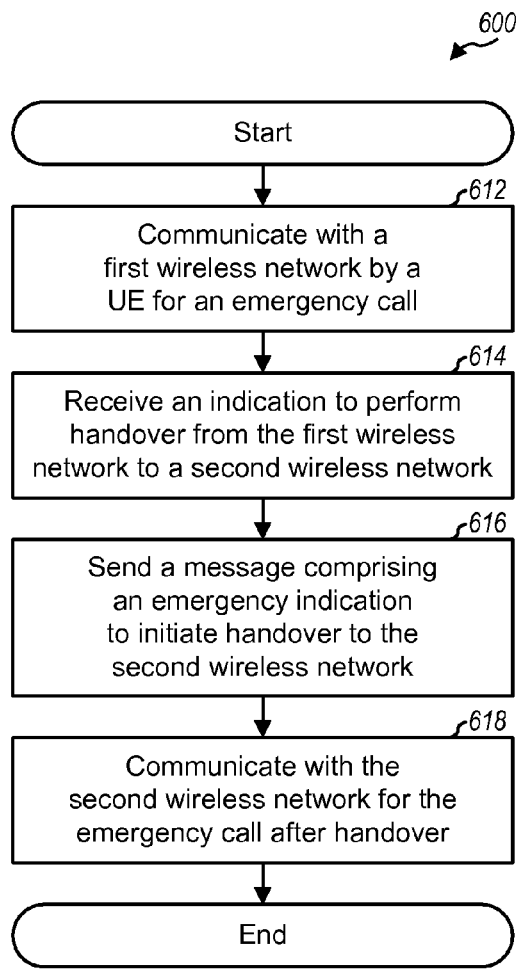
FIG. 6 shows a process for performing handover of an emergency call by a UE.

FIG. 6 shows a design of a process 600 for performing handover of an emergency call by a UE. Process 600 may be performed by the UE (as described below) or by some other entity. The UE may communicate with a first wireless network for an emergency call (block 612). The UE may receive an indication to perform handover from the first wireless network to a second wireless network (block 614). The UE may send a message comprising an emergency indication to initiate handover to the second wireless network (block 616). The UE may then communicate with the second wireless network for the emergency call after handover (block 618).

The emergency indication may comprise an EGN, or a reserved emergency number, or a preconfigured number, or a designated indication used to identify the emergency call to a designated network entity in the second wireless network, or some other indication. In one design, the emergency call may be anchored in a network server (e.g., an E-SCC AS) that may replace a first incoming call leg via the first wireless network with a second incoming call leg via the second wireless network for handover of the emergency call. The emergency indication may be mapped to an E-STN-SR used to route the second incoming call leg to the network server.

In one design, the first wireless network may utilize a first RAT, and the second wireless network may utilize a second RAT that is different from the first RAT. In one design, the UE may communicate with an E-UTRAN for the emergency call prior to handover and may communicate with a 1xRTT RAN for the emergency call after handover. The UE may send a 1xRTT Origination message comprising the emergency indication. The first and second wireless networks may also utilize other RATs.

In one design, the UE may obtain location services via the first wireless network prior to handover and via the second wireless network after handover. The UE may be served by a source serving node in the first wireless network prior to handover and by a target serving node in the second wireless network after handover. An identity of the target serving node may be sent to a location server to support location services for the UE after handover. In one design, for target side update, the identity of the target serving node may be sent by the target serving node to the location server in the second wireless network, e.g., as shown in FIG. 4. In another design, for source side update, the identity of the target serving node may be sent by the source serving node to the location server in the first wireless network, e.g., as shown in FIG. 5.

Figure 7:
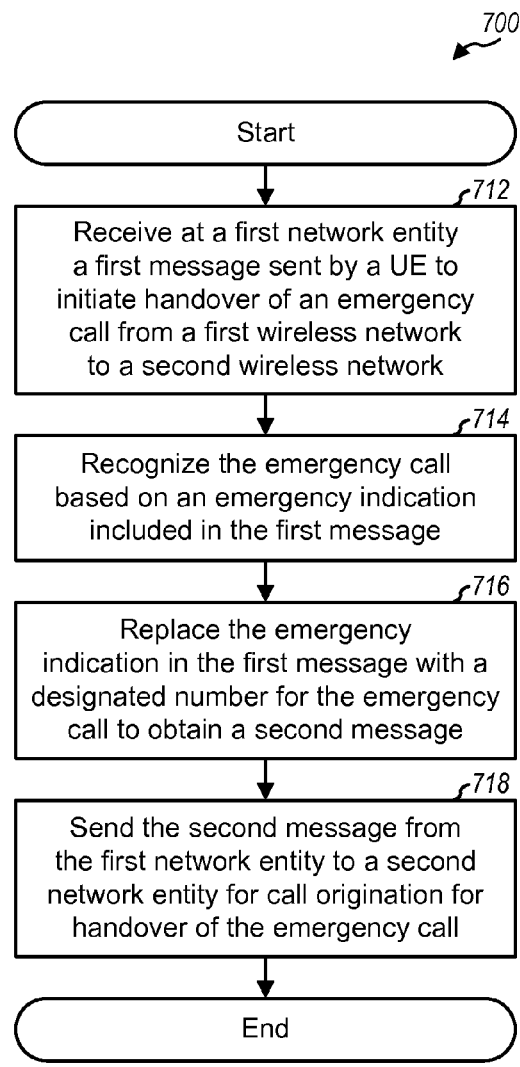
FIG. 7 shows a process for supporting handover of an emergency call by an IWS or MSC.

FIG. 7 shows a design of a process 700 for supporting handover of emergency calls by a first network entity, which may be an 1xCS IWS, an MSC, or some other network entity. The first network entity may receive a first message sent by a UE to initiate handover of an emergency call from a first wireless network to a second wireless network (block 712). The first network entity may recognize the emergency call based on an emergency indication included in the first message (block 714). The first network entity may replace the emergency indication in the first message with a designated number for the emergency call to obtain a second message (block 716). The first network entity may then send the second message to a second network entity for call origination for handover of the emergency call (block 718).

In one design, the emergency indication may comprise an EGN, or a reserved emergency number, or a preconfigured number, or a designated indication used to identify the emergency call to the first network entity, or some other indication. The designated number for the emergency call may comprise a local emergency number, or an E-STN-SR, or some other number. In one design, the emergency indication may comprise an EGN, and the designated number may comprise a local emergency number. In another design, the emergency indication may comprise an EGN, and the designated number may comprise an E-STN-SR.

In one design, the first network entity may comprise an Interworking Solution Function (IWS) interfacing between the first and second wireless networks, and the second network entity may comprise an MSC. In another design, the first network entity may comprise an MSC. The first and second network entities may also comprise other network entities.

Figure 8:
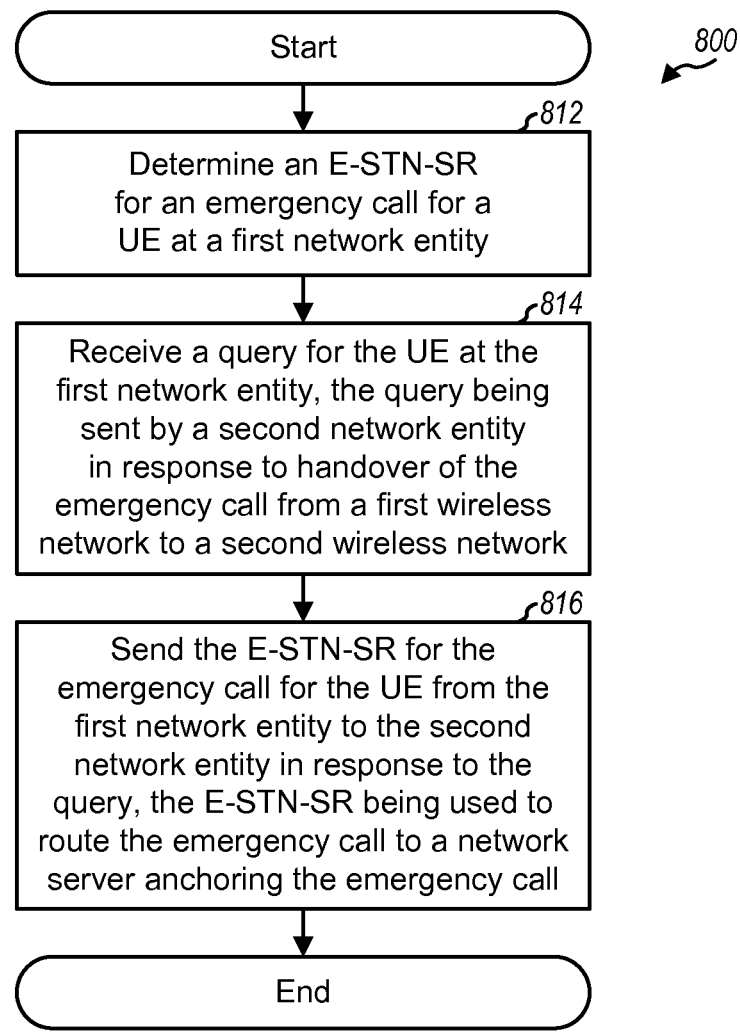
FIG. 8 shows a process for supporting handover of an emergency call by an LRF.

FIG. 8 shows a design of a process 800 for supporting handover of emergency calls by a first network entity, which may be an LRF, an MPC, or some other network entity. The first network entity may determine an E-STN-SR for an emergency call for a UE (block 812). The first network entity may receive a query for the UE, with the query being sent by a second network entity in response to handover of the emergency call from a first wireless network to a second wireless network (block 814). The first network entity may send the E-STN-SR for the emergency call for the UE to the second network entity in response to the query (block 816). The E-STN-SR may be used to route the emergency call to a network server anchoring the emergency call.

In one design, the E-STN-SR may be determined by the first network entity during establishment of the emergency call, and the query may be received during initiation of handover of the emergency call. In one design, the first network entity may comprise an LRF, and the second network entity may comprise an MPC. In another design, the first network entity may comprise an MPC, and the second network entity may comprise an MSC. The first and second network entities may also comprise other network entities.

Figure 9:
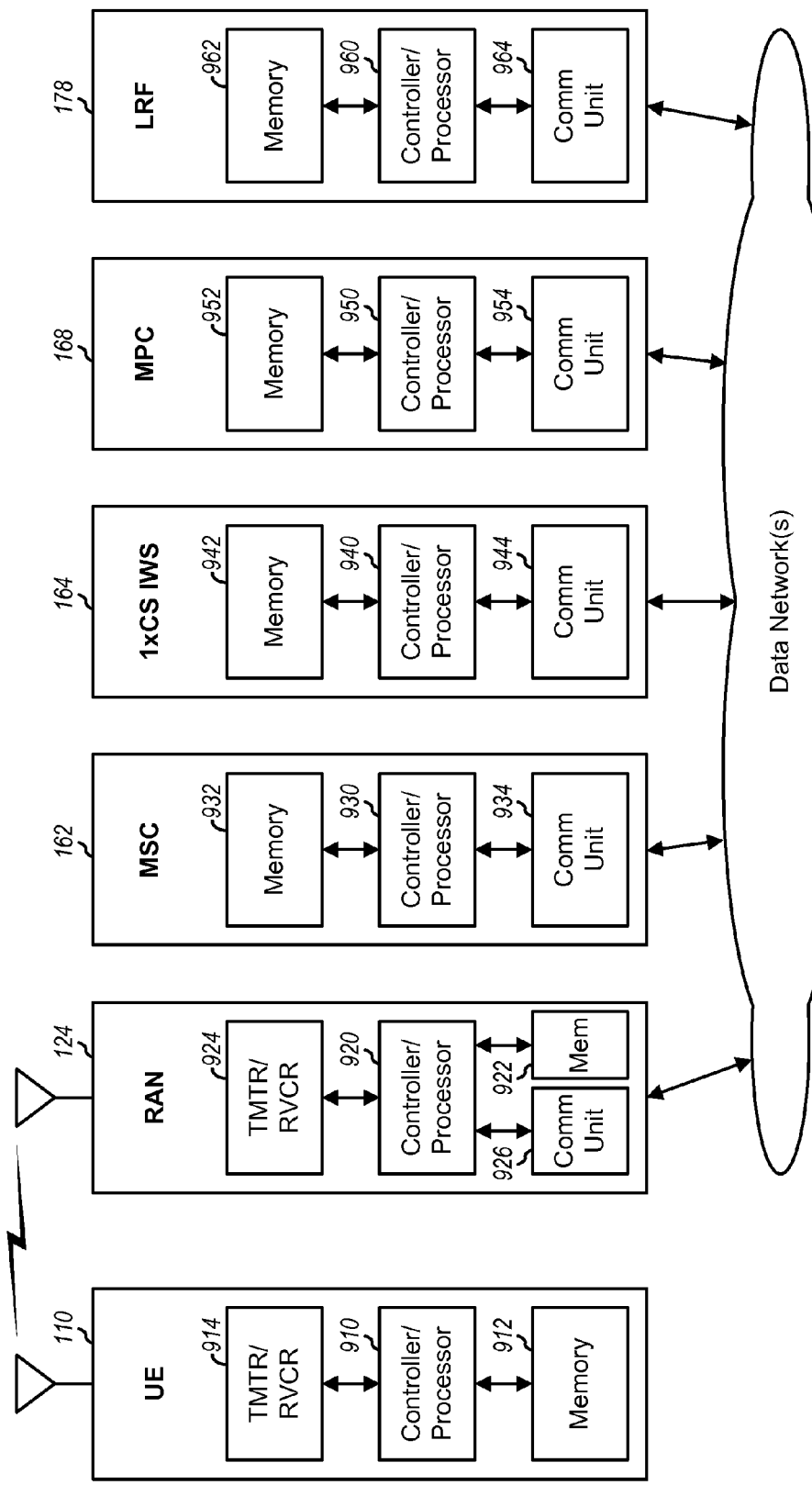
FIG. 9 shows a block diagram of a UE and various network entities.

FIG. 9 shows a block diagram of a design of UE 110, 1xRTT RAN 124, MSC 162, 1xCS IWS 164, MPC 168, and LRF 178 in FIG. 1. For simplicity, FIG. 9 shows (i) one controller/processor 910, one memory 912, and one transmitter/receiver (TMTR/RCVR) 914 for UE 110, (ii) one controller/processor 920, one memory 922, one transmitter/receiver 924, and one communication (Comm) unit 926 for RAN 124, (iii) one controller/processor 930, one memory 932, and one communication unit 934 for MSC 162, (iv) one controller/processor 940, one memory 942, and one communication unit 944 for 1xCS IWS 164, (v) one controller/processor 950, one memory 952, and one communication unit 954 for MPC 168, and (vi) one controller/processor 960, one memory 962, and one communication unit 964 for LRF 178. In general, each entity may include any number of processing units (e.g., controllers, processors, etc.), memories, transceivers, communication units, etc.

On the downlink, base stations in RAN 124 may transmit traffic data, messages/signaling, and pilot to UEs within their coverage areas. These various types of data may be processed by processor 920 and conditioned by transmitter 924 to generate downlink signals, which may be transmitted to UEs. At UE 110, the downlink signals from the base stations in RAN 124 may be received and conditioned by receiver 914 and further processed by processor 910 to obtain various types of information for communication, location, and other services. Processor 910 may perform process 600 in FIG. 6 and processing for UE 110 in FIGS. 2A, 2B and 3. Memories 912 and 922 may store program codes and data for UE 110 and RAN 124, respectively. On the uplink, UE 110 may transmit traffic data, messages/signaling, and pilot to base stations in RAN 124. These various types of data may be processed by processor 910 and conditioned by transmitter 914 to generate an uplink signal, which may be transmitted to RAN 124. At RAN 124, the uplink signals from UE 110 and other UEs may be received and conditioned by receiver 924 and further processed by processor 920 to obtain various types of information sent by the UEs. RAN 124 may communicate with other network entities (e.g., on a data network) via communication unit 926.

Within MSC 162, processor 930 may perform various functions to support communication and other services for UEs. Processor 930 may perform process 700 in FIG. 7 and processing for MSC 162 in FIGS. 2A, 2B, 3, 4 and 5. Memory 932 may store program codes and data for MSC 162. Communication unit 934 may enable MSC 162 to communicate with other network entities.

Within 1xCS IWS 164, processor 940 may perform various functions to support communication and other services for UEs. Processor 940 may perform process 700 in FIG. 7 and processing for 1xCS IWS 164 in FIGS. 2A, 2B and 3. Memory 942 may store program codes and data for 1xCS IWS 164. Communication unit 944 may enable 1xCS IWS 164 to communicate with other entities.

Within MPC 168, processor 950 may perform processing to support positioning and location services for UEs. Processor 950 may perform processing for MPC 168 in FIGS. 3, 4 and 5. Memory 952 may store program codes and data for MPC 168. Communication unit 954 may enable MPC 168 to communicate with other network entities.

Within LRF 178, processor 960 may perform processing to support routing and location for UEs. Processor 960 may perform process 800 in FIG. 8 and processing for LRF 178 in FIG. 3. Memory 962 may store program codes and data for LRF 178. Communication unit 964 may enable LRF 178 to communicate with other network entities.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as hardware, computer software/firmware, or combinations of both. To clearly illustrate this interchangeability of hardware and software/firmware, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

Position determination techniques described herein may be implemented in conjunction with various wireless communication networks such as a wireless wide area network (WWAN), a wireless local area network (WLAN), a wireless personal area network (WPAN), and so on. The term "network" and "system" are often used interchangeably. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, a Long Term Evolution (LTE) network, a WiMAX (IEEE 802.16) network and so on. A CDMA network may implement one or more radio access technologies (RATs) such as cdma2000, Wideband-CDMA (W-CDMA), and so on. Cdma2000 includes IS-95, IS-2000, and IS-856 standards. A TDMA network may implement Global System for Mobile Communications (GSM), Digital Advanced Mobile Phone System (D-AMPS), or some other RAT. GSM and W-CDMA are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available. A WLAN may be an IEEE 802.11x network, and a WPAN may be a Bluetooth network, an IEEE 802.15x, or some other type of network. The techniques may also be implemented in conjunction with any combination of WWAN, WLAN and/or WPAN. The techniques may also be implemented in conjunction with femtocells.

A satellite positioning system (SPS) typically includes a system of transmitters positioned to enable entities to determine their location on or above the Earth based, at least in part, on signals received from the transmitters. Such a transmitter typically transmits a signal marked with a repeating pseudo-random noise (PN) code of a set number of chips and may be located on ground based control stations, user equipment and/or space vehicles. In a particular example, such transmitters may be located on Earth orbiting satellite vehicles (SVs). For example, a SV in a constellation of Global Navigation Satellite System (GNSS) such as Global Positioning System (GPS), Galileo, Glonass or Compass may transmit a signal marked with a PN code that is distinguishable from PN codes transmitted by other SVs in the constellation (e.g., using different PN codes for each satellite as in GPS or using the same code on different frequencies as in Glonass). In accordance with certain aspects, the techniques presented herein are not restricted to global systems (e.g., GNSS) for SPS. For example, the techniques provided herein may be applied to or otherwise enabled for use in various regional systems, such as, e.g., Quasi-Zenith Satellite System (QZSS) over Japan, Indian Regional Navigational Satellite System (IRNSS) over India, Beidou over China, etc., and/or various augmentation systems (e.g., an Satellite Based Augmentation System (SBAS)) that may be associated with or otherwise enabled for use with one or more global and/or regional navigation satellite systems. By way of example but not limitation, an SBAS may include an augmentation system(s) that provides integrity information, differential corrections, etc., such as, e.g., Wide Area Augmentation System (WAAS), European Geostationary Navigation Overlay Service (EGNOS), Multi-functional Satellite Augmentation System (MSAS), GPS Aided Geo Augmented Navigation or GPS and Geo Augmented Navigation system (GAGAN), and/or the like. Thus, as used herein an SPS may include any combination of one or more global and/or regional navigation satellite systems and/or augmentation systems, and SPS signals may include SPS, SPS-like, and/or other signals associated with such one or more SPS.

A user equipment (UE) refers to a device such as a cellular or other wireless communication device, personal communication system (PCS) device, personal navigation device (PND), Personal Information Manager (PIM), Personal Digital Assistant (PDA), laptop or other suitable mobile device which is capable of receiving wireless communication and/or navigation signals. The term "user equipment" is also intended to include devices which communicate with a personal navigation device (PND), such as by short-range wireless, infrared, wireline connection, or other connection—regardless of whether satellite signal reception, assistance data reception, and/or position-related processing occurs at the device or at the PND. Also, "user equipment" is intended to include all devices, including wireless communication devices, computers, laptops, etc. which are capable of communication with a server, such as via the Internet, Wi-Fi, or other network, and regardless of whether satellite signal reception, assistance data reception, and/or position-related processing occurs at the device, at a server, or at another device associated with the network. Any operable combination of the above are also considered a "user equipment."

The methodologies described herein may be implemented by various means depending upon the application. For example, these methodologies may be implemented in hardware, firmware, software, or any combination thereof. For an implementation involving hardware, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For an implementation involving firmware and/or software, the methodologies may be implemented with modules (e.g., procedures, functions, and so on) that perform the functions described herein. Any machine-readable medium tangibly embodying instructions may be used in implementing the methodologies described herein. For example, software codes may be stored in a memory and executed by a processing unit. Memory may be implemented within the processing unit or external to the processing unit. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or code on a computer-readable medium. Examples include computer-readable media encoded with a data structure and computer-readable media encoded with a computer program. Computer-readable medium may take the form of an article of manufacture. Computer-readable medium includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage, semiconductor storage, or other storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

In addition to storage on computer-readable medium, instructions and/or data may be provided as signals on transmission media included in a communication apparatus. For example, a communication apparatus may include a transceiver having signals indicative of instructions and data. The instructions and data are configured to cause one or more processing units to implement the functions outlined in the claims. That is, the communication apparatus includes transmission media with signals indicative of information to perform disclosed functions. At a first time, the transmission media included in the communication apparatus may include a first portion of the information to perform the disclosed functions, while at a second time the transmission media included in the communication apparatus may include a second portion of the information to perform the disclosed functions.

The previous description of the disclosure is provided to enable any person skilled in the art to make or use the disclosure. Various modifications to the disclosure will be readily apparent to those skilled in the art, and the generic principles defined herein may be applied to other variations without departing from the scope of the disclosure. Thus, the disclosure is not intended to be limited to the examples and designs described herein but is to be accorded the widest scope consistent with the principles and novel features disclosed herein.

What is claimed is:

1. A method for wireless communication, comprising:
communicating with a packet-switched wireless network by a user equipment (UE) for an emergency call;
receiving an indication to perform handover from the packet-switched wireless network to a circuit-switched wireless network;
sending a message from the UE, the message comprising an emergency indication to initiate handover to the circuit-switched wireless network, the emergency indication comprising a preconfigured called party number, wherein an Emergency Session Transfer Number for single radio voice call continuity (SRVCC) (E-STN-SR) for the emergency call of the UE is sent by a Mobile Positioning Center (MPC) to a Mobile Switching Center (MSC) of the circuit-switched wireless network in response to a query from the MSC;
communicating with the circuit-switched wireless network for the emergency call after handover;
obtaining location services via the packet-switched wireless network for the emergency call prior to handover; and
obtaining location services via the circuit-switched wireless network for the emergency call after handover.

2. The method of claim 1, wherein the emergency call is anchored in a network server that replaces a first incoming call leg via the packet-switched wireless network with a second incoming call leg via the circuit-switched wireless network for handover of the emergency call.

3. The method of claim 2, wherein the emergency indication is mapped to the E-STN-SR used to route the second incoming call leg to the network server.

4. The method of claim 1, wherein the packet-switched wireless network utilizes a first radio access technology (RAT), and wherein the circuit-switched wireless network utilizes a second RAT different from the first RAT.

5. The method of claim 1, wherein the communicating with the packet-switched wireless network comprises communicating with an Evolved Universal Terrestrial Radio Access Network (E-UTRAN) for the emergency call prior to handover, and wherein the communicating with the circuit-switched wireless network comprises communicating with a 1xRTT Radio Access Network (RAN) for the emergency call after handover.

6. The method of claim 1, wherein the sending the message comprises sending a 1xRTT Origination message comprising the emergency indication.

7. The method of claim 1, wherein the UE is served by a source serving node in the packet-switched wireless network prior to handover and by a target serving node in the circuit-switched wireless network after handover, and wherein an identity of the target serving node is sent to a location server to support location services for the UE after handover.

8. The method of claim 7, wherein the identity of the target serving node is sent by the target serving node to the location server in the circuit-switched wireless network.

9. The method of claim 7, wherein the identity of the target serving node is sent by a source serving node in the packet-switched wireless network to the location server.

10. An apparatus for wireless communication, comprising:
means for communicating with a packet-switched wireless network by a user equipment (UE) for an emergency call;
means for receiving an indication to perform handover from the packet-switched wireless network to a circuit-switched wireless network;
means for sending a message from the UE comprising an emergency indication to initiate handover to the circuit-switched wireless network, the emergency indication comprising a preconfigured called party number,
wherein an Emergency Session Transfer Number for single radio voice call continuity (SRVCC) (E-STN-SR) for the emergency call of the UE is sent by a Mobile Positioning Center (MPC) to a Mobile Switching Center (MSC) of the circuit-switched wireless network in response to a query from the MSC;
means for communicating with the circuit-switched wireless network for the emergency call after handover;
means for obtaining location services via the packet-switched wireless network for the emergency call prior to handover; and
means for obtaining location services via the circuit-switched wireless network for the emergency call after handover.

11. The apparatus of claim 10, wherein the emergency call is anchored in a network server that replaces a first incoming call leg via the packet-switched wireless network with a second incoming call leg via the circuit-switched wireless network for handover of the emergency call.

12. The apparatus of claim 11, wherein the emergency indication is mapped to the E-STN-SR used to route the second incoming call leg to the network server.

13. The apparatus of claim 10, wherein the UE is served by a source serving node in the packet-switched wireless network prior to handover and by a target serving node in the circuit-switched wireless network after handover, and wherein an identity of the target serving node is sent to a location server to support location services for the UE after handover.

14. An apparatus for wireless communication, comprising:
at least one processing unit configured to communicate with a packet-switched wireless network by a user equipment (UE) for an emergency call, to receive an indication to perform handover from the packet-switched wireless network to a circuit-switched wireless network, to send a message comprising an emergency indication to initiate handover of the emergency call to the circuit-switched wireless network, the emergency indication comprising a preconfigured called party number,
wherein an Emergency Session Transfer Number for single radio voice call continuity (SRVCC) (E-STN-SR) for the emergency call of the UE is sent by a Mobile Positioning Center (MPC) to a Mobile Switching Center (MSC) of the circuit-switched wireless network in response to a query from the MSC, to communicate with the circuit-switched wireless network for the emergency call after handover, to obtain location services via the packet-switched wireless network for the emergency call prior to handover, and to obtain location services via the circuit-switched wireless network for the emergency call after handover.

15. The apparatus of claim 14, wherein the emergency call is anchored in a network server that replaces a first incoming call leg via the packet-switched wireless network with a second incoming call leg via the circuit-switched wireless network for handover of the emergency call.

16. The apparatus of claim 15, wherein the emergency indication is mapped to the E-STN-SR used to route the second incoming call leg to the network server.

17. A computer program product, comprising:
a non-transitory computer-readable medium comprising:
code to cause at least one computer to communicate with a packet-switched wireless network by a user equipment (UE) for an emergency call;
code to cause the at least one computer to receive an indication to perform handover from the packet-switched wireless network to a circuit-switched wireless network;
code to cause the at least one computer to send a message comprising an emergency indication to initiate handover to the circuit-switched wireless network, the emergency indication comprising a preconfigured called party number,
wherein an Emergency Session Transfer Number for single radio voice call continuity (SRVCC) (E-STN-SR) for the emergency call of the UE is sent by a Mobile Positioning Center (MPC) to a Mobile Switching Center (MSC) of the circuit-switched wireless network in response to a query from the MSC;
code to cause the at least one computer to communicate with the circuit-switched wireless network for the emergency call after handover;
code to cause the at least one computer to obtain location services via the packet-switched wireless network for the emergency call prior to handover; and code to cause the at least one computer to obtain location services via the circuit-switched wireless network for the emergency call after handover.

18. A method of supporting wireless communication, comprising:
receiving at a network entity a first message sent by a user equipment (UE) to initiate handover of an emergency call from a packet-switched wireless network to a circuit-switched wireless network;
recognizing the emergency call based on an emergency indication included in the first message;
determining a designated number for the emergency call from a location server;
replacing the emergency indication in the first message with the designated number for the emergency call to obtain a second message;
sending the second message from the network entity to a Mobile Switching Center (MSC) of the circuit-switched wireless network for call origination for handover of the emergency call,
wherein an Emergency Session Transfer Number for single radio voice call continuity (SRVCC) (E-STN-SR) for the emergency call of the UE is sent by a Mobile Positioning Center (MPC) to the MSC in response to a query from the MSC; and
sending an identity of a target serving node in the circuit-switched wireless network to the location server to support location services for the UE in the circuit-switched wireless network after handover and during at least the emergency call to maintain location continuity.

19. The method of claim 18, wherein the emergency indication comprises an emergency global number (EGN), or a reserved emergency number, or a preconfigured number, or a designated indication used to identify the emergency call to the network entity.

20. The method of claim 18, wherein the designated number for the emergency call comprises a local emergency number or the E-STN-SR.

21. The method of claim 18, wherein the emergency indication comprises an emergency global number (EGN), and wherein the designated number comprises a local emergency number.

22. The method of claim 18, wherein the emergency indication comprises an emergency global number (EGN), and wherein the designated number comprises the E-STN-SR.

23. The method of claim 18, wherein the network entity comprises an Interworking Solution Function (IWS) interfacing between the packet switched and circuit-switched wireless networks.

24. The method of claim 18, wherein the network entity comprises a Mobile Switching Center (MSC) of the packet-switched wireless network.

25. An apparatus for wireless communication, comprising:
means for receiving at a network entity a first message sent by a user equipment (UE) to initiate handover of an emergency call from a packet-switched wireless network to a circuit-switched wireless network;
means for recognizing the emergency call based on an emergency indication included in the first message;
means for determining a designated number for the emergency call from a location server;
means for replacing the emergency indication in the first message with the designated number for the emergency call to obtain a second message;
means for sending the second message from the network entity to a Mobile Switching Center (MSC) of the circuit-switched wireless network for call origination for handover of the emergency call,
wherein an Emergency Session Transfer Number for single radio voice call continuity (SRVCC) (E-STN-SR) for the emergency call of the UE is sent by a Mobile Positioning Center (MPC) to the MSC in response to a query from the MSC; and
means for sending an identity of a target serving node in the circuit-switched wireless network to the location server to support location services for the UE in the circuit-switched wireless network after handover and during at least the emergency call to maintain location continuity.

26. The apparatus of claim 25, wherein the emergency indication comprises an emergency global number (EGN), or a reserved emergency number, or a preconfigured number, or a designated indication used to identify the emergency call to the network entity.

27. The apparatus of claim 25, wherein the designated number for the emergency call comprises a local emergency number or the E-STN-SR.

28. A method of supporting wireless communication, comprising:
determining an Emergency Session Transfer Number for single radio voice call continuity (SRVCC) (E-STN-SR) for an emergency call for a user equipment (UE) at a network entity;
receiving a query for the UE at the network entity, the query being sent by a Mobile Switching Center (MSC) of a circuit-switched wireless network in response to handover of the emergency call from a packet-switched-wireless network to the circuit-switched wireless network;
sending, by a Mobile Positioning Center (MPC), the E-STN-SR for the emergency call for the UE from the network entity to the MSC in response to the query, the E-STN-SR being used to route the emergency call to a network server anchoring the emergency call; and
sending an identity of a target serving node in the circuit-switched wireless network to the location server to support location services for the UE in the circuit-switched wireless network after handover and during at least the emergency call to maintain location continuity.

29. The method of claim 28, wherein the E-STN-SR is determined by the network entity during establishment of the emergency call, and wherein the query is received during initiation of handover of the emergency call.

30. The method of claim 28, wherein the network entity comprises a Location and Routing Function (LRF).

31. An apparatus for supporting wireless communication, comprising:
means for determining an Emergency Session Transfer Number for single radio voice call continuity (SRVCC) (E-STN-SR) for an emergency call for a user equipment (UE) at a network entity;
means for receiving a query for the UE at the network entity, the query being sent by a Mobile Switching Center (MSC) of a circuit-switched wireless network in response to handover of the emergency call from a packet-switched wireless network to the circuit-switched wireless network;
sending, by a Mobile Positioning Center (MPC), the E-STN-SR for the emergency call for the UE from the network entity to the MSC in response to the query, the E-STN-SR being used to route the emergency call to a network server anchoring the emergency call; and
means for sending an identity of a target serving node in the circuit-switched wireless network to the location server to support location services for the UE in the circuit-switched wireless network after handover and during at least the emergency call to maintain location continuity.

32. The apparatus of claim 31, wherein the E-STN-SR is determined by the network entity during establishment of the emergency call, and wherein the query is received during initiation of handover of the emergency call.

* * * * *